UNITED STATES PATENT OFFICE.

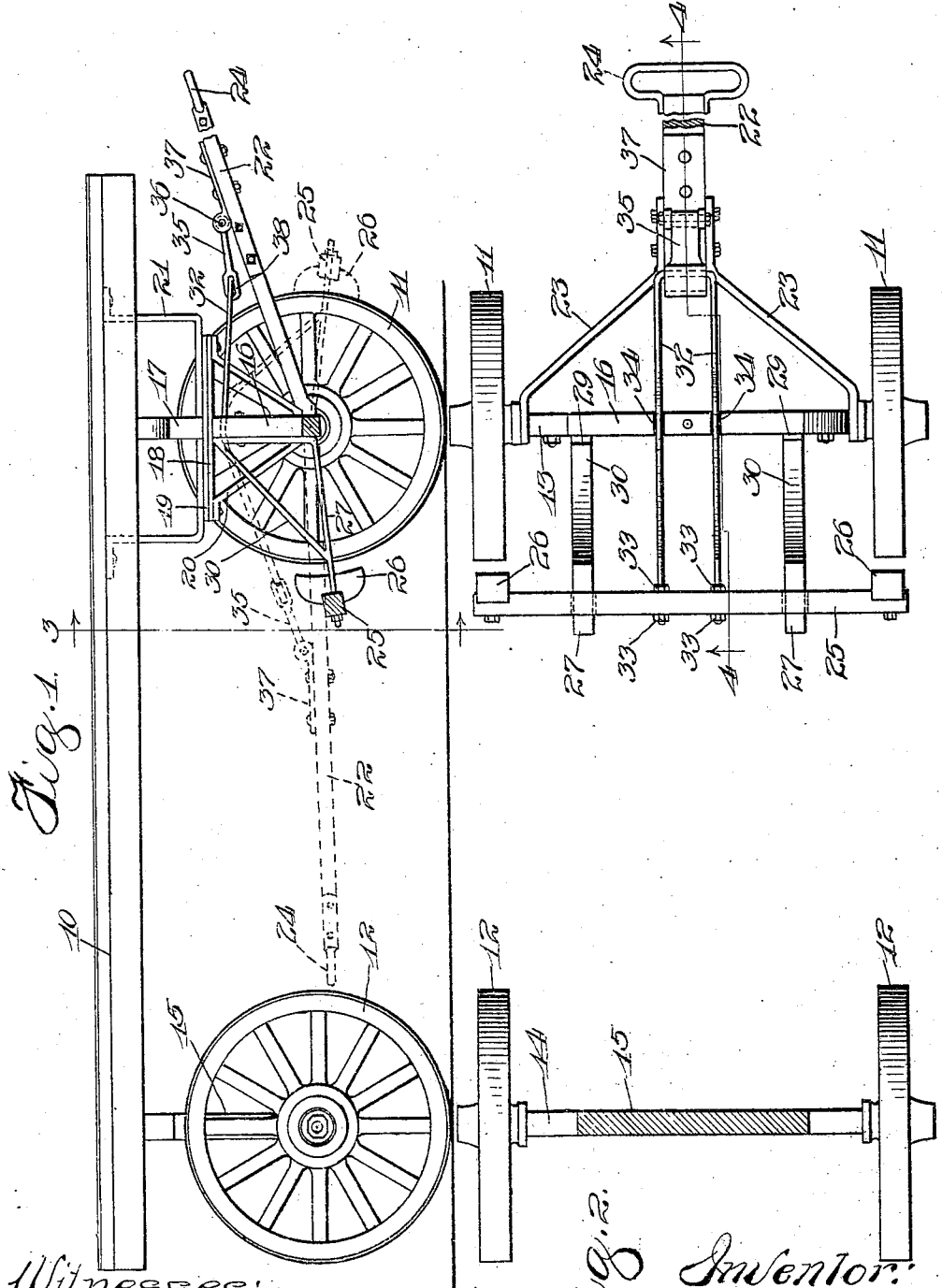

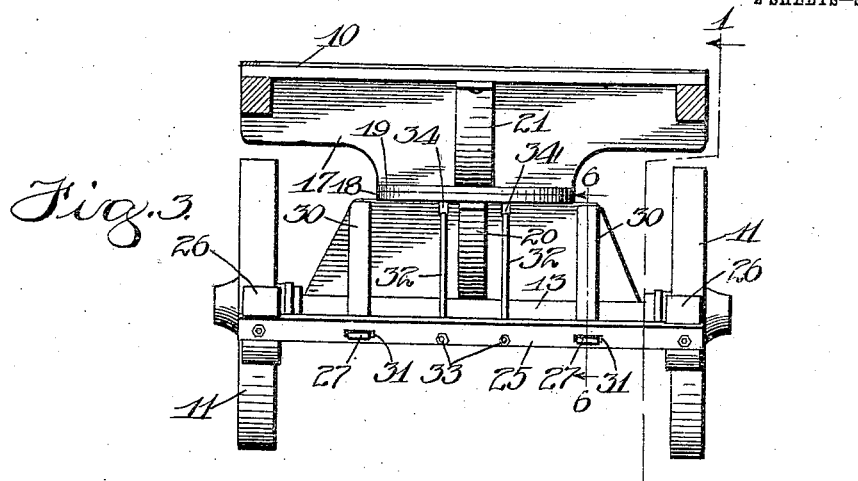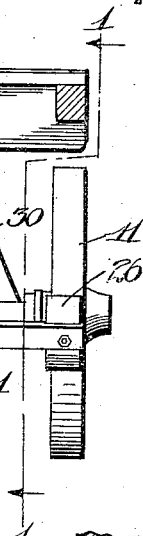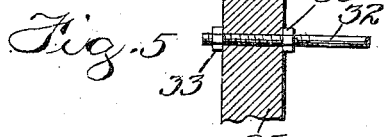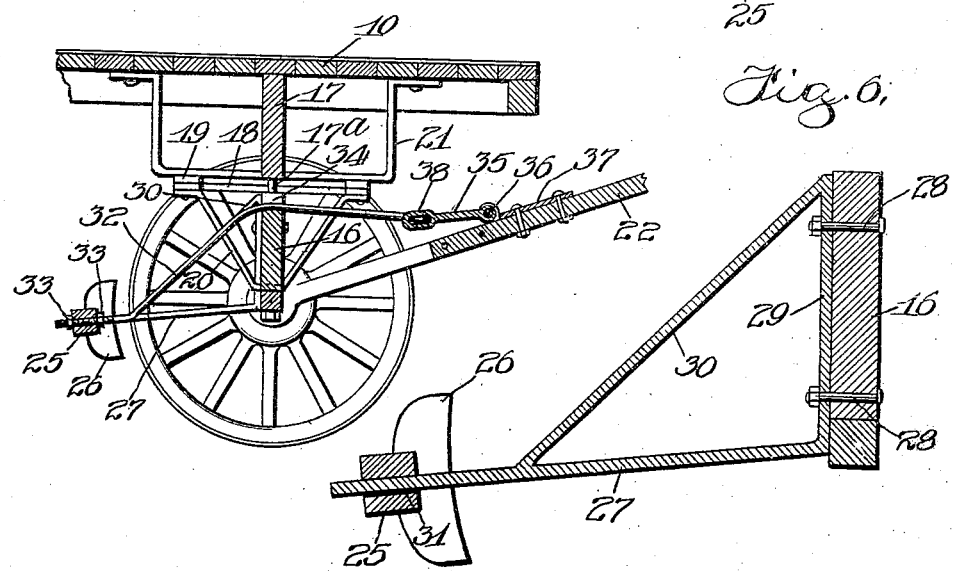

PHILIP KERRIGAN, OF CHICAGO, ILLINOIS, ASSIGNOR OF TWO-THIRDS TO HIMSELF AND ONE-THIRD TO EDWARD S. AVERILL, OF CHICAGO, ILLINOIS.

TRUCK.

No. 855,405.  Specification of Letters Patent.  Patented May 28, 1907.

Application filed March 2, 1906. Serial No. 303,798.

*To all whom it may concern:*

Be it known that I, PHILIP KERRIGAN, a citizen of the United States, residing at Chicago, in the county of Cook and State of Illinois, have invented certain new and useful Improvements in Trucks, of which the following is a specification, reference being had to the accompanying drawings.

This invention relates to trucks of the kind ordinarily employed by railway and express companies for moving baggage and express packages across railway platforms to and from trains. It sometimes happens that such trucks are left so close to the railroad track that the suction produced by a rapidly-moving train will cause such trucks to be drawn under or against the train, thereby causing a serious accident; and it sometimes happens that such trucks are accidentally rolled from the positions in which they are left by other means.

It is the object of my invention to provide a new and improved automatic braking mechanism of which the vertically-movable pivoted tongue, with which all such trucks are equipped for moving them about, forms a part, whereby, upon the dropping of the tongue by the party holding the truck, brakes will be instantly and effectively applied to the front wheels of the truck, thus insuring the truck against accidental movement.

It is a further object of my invention to provide braking mechanism supported wholly from the front axle of such truck so that the braking of the truck will be equally well effected regardless of the position into which the tongue may be turned—that is, regardless of whether the tongue projects straight in front of the truck or is turned to lie wholly beneath the truck platform, or at any point intermediate of these two positions.

I accomplish these objects by the means shown in the drawings and hereinafter specifically described.

That which I regard as new will be set forth in the claims.

In the drawings,—Figure 1 is a side elevation of my improved truck, partly in section, the section being taken at line 1—1 of Fig. 3. In this figure is also shown in dotted lines the position of the parts when the tongue is turned completely under the truck platform; Fig. 2 is a top or plan view of the running gear,—the rear bolster being in section, and the platform of the truck and the metal circles or fifth-wheel being removed; Fig. 3 is a rear view of the front axle portion of the truck,—the platform being in section, such section being taken at line 3—3 of Fig. 1; Fig. 4 is a vertical section through the forward part of the truck, taken at line 4—4 of Fig. 2; Fig. 5 is a detail, showing the manner of connecting the brake-rod to the brake-beam; and Fig. 6 is an enlarged detail, being a vertical section at line 6—6 of Fig. 3, and illustrating the means for supporting the brake-beam.

Referring to the several figures of the drawings, in which corresponding parts are indicated by like reference numerals,—10 indicates the truck platform.

11 indicates the front wheels; 12 the rear wheels.

13 indicates the front axle, 14 the rear axle, and 15 the single bolster carried by the rear axle and upon which rests the platform 10.

16 indicates the axle-bolster, and 17 the body-bolster at the forward end of the truck,—these two bolsters being connected by a king-bolt 17ª.

18 and 19 indicate the circles constituting the ordinary fifth-wheel, which are carried, respectively, by the axle-bolster 16 and body-bolster 17, as usual,—such circles being braced, respectively, by suitable braces 20 and 21.

22 indicates a tongue secured by diagonal braces 23 to the forward axle 13, as usual, and provided at its forward end with a handle portion 24.

The parts so far described are the ordinary parts of trucks of this kind, constructed and arranged in the usual and well-known manner.

25 indicates a brake-beam extending across the truck in rear of the forward wheels 11 and carrying suitable shoes 26 adapted to be forced against such rear wheels 11. This brake-beam is mounted on the rear ends of two arms 27,—such arms, in the construction shown, inclining downwardly toward the rear of the truck and being secured at their forward ends to the rear face of the axle-bolster 16. As shown, they are secured to this axle-bolster by bolts 28 passing through such axle-bolster and through an up-turned end 29 of the arm 27,—the up-turned end 29 and the arm 27 being braced together by a suitable brace 30. If desired, these parts 27, 29 and 30 can be formed integrally, as indicated in the drawings. The brake-beam is provided with two openings 31 through which pass the inclined arms 27,—such openings 31 being large enough to permit the brake-beam to be moved freely on such inclined arms.

32 indicates a brake-rod, which, in the form of construction shown, is doubled on itself so as to form two parallel parts,—the ends of such rod passing through suitable openings in the brake-beam 25 and adjustably secured in place by nuts 33 secured thereon and bearing against the inner and outer faces of such brake-beam. This brake-rod 32, as shown, is bent upward just forward of its connection with the brake-beam 25, and, as shown, passes through slots 34 formed in the upper edge of the axle-bolster 16. The forward portion of this brake-rod—which, in the construction shown, is the bent central portion of the rod—is connected to the tongue 22,—the connection, in the construction shown, being through a link 35 that is connected by a suitable pivot 36 to a plate 37 that is bolted to the upper face of the tongue. As clearly shown in Fig. 4, and as indicated by dotted lines in Fig. 2, the rear end of the link 35 has formed in it an elongated eye 38, through which the bent brake-rod 32 passes.

When the parts are assembled, the brake-beam 25 will be adjusted by means of the nuts 33 on the ends of the brake-rod 32 so that the brake-shoes will stand clear of the front wheels when the tongue 22 is raised into the position that it will assume when the truck is to be moved, but will be drawn up against the wheels through the pulling action of the brake-rod when the tongue is dropped. By reason of the pivoted link 35, to which the forward end of the brake-rod 32 is attached, and also by reason of the elongated eye in which the rod is secured, a considerable range of vertical movement of the tongue is permitted without drawing the brakes against the wheels, and this is important in that the tongue is frequently jerked up and down more or less as the truck is dragged along, due to inequalities in the surface over which it is drawn, and it is also important in that it permits of the tongue being raised or lowered within considerable limits to accommodate men of different heights who may have to handle the truck. Attention has been directed to the fact that the parts 27 upon which the brake-beam is slidingly mounted are inclined downward toward the rear, and such inclination I regard as of considerable value for two reasons. First, that it brings the brake-shoes against the wheels at points a little below the axle of such wheels, which is the proper place to apply the brakes for the best results, as is well known, and, second, because owing to the upward inclination of the rear part of the brake-rod 32 the pull of such brake-rod is not only in a forward direction but also to some extent in an upward direction, and therefore the brake-beam is more easily moved toward the wheels on the inclined supporting-bars than if such bars were perfectly horizontal.

As best shown in Figs. 2 and 3, the slots 34 in the axle-bolster 16 are located at each side of the king-bolt 17$^a$, with the result that the ends of the rod 32 are attached at equal distances from the center of the brake-beam, thus insuring the brake-beam being moved forward or back without binding against the sides of these supporting-bars 27. It will also be noted that the entire braking mechanism and all its attached parts are connected with the forward axle of the truck or the axle-bolster carried thereby. This construction permits of an equally efficient application of the brake-shoes to the wheels regardless of the position to which the tongue may be turned laterally, and an equally efficient application of the brake-shoes when the tongue is turned entirely beneath the truck platform, as indicated in dotted lines in Fig. 1; for, inasmuch as all of the parts move together, they always occupy the same relative position and the dropping of the tongue will at any time exert a pull on the brake-rod 32, causing the brake-beam to slide up on its supporting-bars 27 and set the brake-shoes against the wheels.

I have shown and described my improvements applied to an ordinary form of baggage-truck, as it is in connection with such a device that I deem my invention to be of peculiar value, but it is evident that other forms of wheeled vehicles can also be provided with my improvements, and I therefore wish it to be understood that, while described in connection with a baggage truck, the invention is not restricted to such use.

That which I claim as my invention and desire to secure by Letters Patent is,—

1. In a wheeled vehicle, the combination with a pivoted tongue, of a brake-beam in rear of and adjacent to the front wheels of the vehicle, a rod connected at its rear end to the brake-beam, and a pivoted arm on the tongue provided with an elongated eye, into which eye the forward end of said rod projects, substantially as described.

2. In a wheeled vehicle, the combination with the front axle thereof and a bolster, of a pivoted tongue, a brake-beam in rear of and adjacent to the front wheels of the vehicle, and a rod connected at its forward end to the tongue and at its rear end to the brake-beam and adapted to pull the brake-beam forward when the forward end of the tongue is dropped, said bolster being slotted for the passage of said rod, substantially as described.

3. In a wheeled vehicle, the combination with the front axle thereof, a movable tongue connected therewith and a bolster on said axle, of a brake-beam in rear of and adjacent to the front wheels of the vehicle, a supporting-bar for said brake-beam secured to said bolster, said supporting-bar extending rearwardly and downwardly and loosely engaging the brake-beam, and a rod connected at its rear end to said brake-beam and at its front end to said tongue and passing through an opening in said bolster, substantially as described.

PHILIP KERRIGAN.

Witnesses:
ALBERT H. ADAMS,
MINNIE A. HUNTER.